United States Patent
Lee

(10) Patent No.: US 10,908,699 B2
(45) Date of Patent: Feb. 2, 2021

(54) ELECTRONIC APPARATUS, WIRELESS INPUT DEVICE AND CONTROL METHOD THEREOF

(71) Applicants: LITE-ON ELECTRONICS (GUANGZHOU) LIMITED, Guangzhou (CN); Lite-On Technology Corporation, Taipei (TW)

(72) Inventor: Mu-Chuan Lee, Taipei (TW)

(73) Assignees: LITE-ON ELECTRONICS (GUANGZHOU) LIMITED, Guangzhou (CN); Lite-On Technology Corporation, Taipei (TW)

(*) Notice: Subject to any disclaimer, the term of this patent is extended or adjusted under 35 U.S.C. 154(b) by 0 days.

(21) Appl. No.: 16/548,774

(22) Filed: Aug. 22, 2019

(65) Prior Publication Data
US 2020/0064928 A1 Feb. 27, 2020

Related U.S. Application Data

(60) Provisional application No. 62/722,191, filed on Aug. 24, 2018.

(30) Foreign Application Priority Data

May 9, 2019 (CN) .......................... 2019 1 0383380

(51) Int. Cl.
| | | |
|---|---|---|
| H04B 1/38 | (2015.01) | |
| G06F 3/02 | (2006.01) | |
| G06F 3/023 | (2006.01) | |
| H02J 50/20 | (2016.01) | |
| H04B 1/40 | (2015.01) | |

(52) U.S. Cl.
CPC .......... G06F 3/0227 (2013.01); G06F 3/0231 (2013.01); H02J 50/20 (2016.02); H04B 1/40 (2013.01)

(58) Field of Classification Search
CPC ........ H02J 50/20; H02J 5/005; H04B 1/0064; H04W 4/80; G06F 3/0227; G06F 3/0031
See application file for complete search history.

(56) References Cited

U.S. PATENT DOCUMENTS

| | | | | |
|---|---|---|---|---|
| 2006/0035590 | A1* | 2/2006 | Morris ................. | G06F 3/0231 455/41.2 |
| 2013/0084798 | A1* | 4/2013 | Faithorn ............... | H04W 76/14 455/41.1 |
| 2014/0001875 | A1* | 1/2014 | Nahidipour ........... | H02J 50/10 307/104 |
| 2017/0228038 | A1* | 8/2017 | Tangen ................. | G06F 1/1626 |

* cited by examiner

Primary Examiner — Tuan Pham
(74) Attorney, Agent, or Firm — JCIPRNET

(57) ABSTRACT

An electronic apparatus, a wireless input device and a control method thereof are provided. The wireless input device includes a wireless signal receiver, a control chip, and a wireless signal transmitter. The wireless signal receiver receives a radio frequency signal. The control chip is activated according to the radio frequency signal and generates operation power according to the radio frequency signal. The control chip generates input information by detecting an input operation on an input interface based on the operation power. The wireless signal transmitter transmits the input information to an external electronic apparatus based on the operation power.

19 Claims, 5 Drawing Sheets

ELECTRONIC APPARATUS, WIRELESS INPUT DEVICE AND CONTROL METHOD THEREOF

CROSS-REFERENCE TO RELATED APPLICATION

This application claims the priority benefits of U.S. provisional application Ser. No. 62/722,191, filed on Aug. 24, 2018, and China application serial no. 201910383380.4, filed on May 9, 2019. The entirety of each of the above-mentioned patent applications is hereby incorporated by reference herein and made a part of this specification.

BACKGROUND OF THE INVENTION

1. Field of the Invention

The present invention relates to a wireless input device and a control method thereof, and in particular, to a wireless input device that is operable without a built-in power supply and a control method thereof.

2. Description of Related Art

Along with the progress of electronic sciences and technologies, electronic apparatuses have become essential tools in daily life. For improving convenience in use, interface devices of electronic apparatuses tend to be wireless in design. Wireless input devices also become a tendency.

In a conventional technical field, an additional power supply is usually required to be arranged in a wireless input device to supply power and maintain operations for electronic components contained in the wireless input device. In general, a battery is assembled inside the wireless input device. However, for maintaining steady operation of the conventional wireless input device, a standby battery is required to prevent the condition that the wireless input device may not operate because of low charging voltage of the battery. In addition, a relatively large space is also required in the wireless input device to accommodate the battery, which increases the production cost. Moreover, for the standby battery, electric leakage may occur to cause power waste, or battery fluid leakage may occur to damage the wireless input device to further bring difficulties in product maintenance.

SUMMARY OF THE INVENTION

The present invention provides a wireless input device and a control method thereof. The wireless input device may be powered by the wireless input device per se independently of an external battery.

The present invention also discloses an electronic apparatus, which applies the aforementioned wireless input device.

The wireless input device of the present invention includes a wireless signal receiver, a control chip and a wireless signal transmitter. The wireless signal receiver receives a radio frequency signal by an external electronic apparatus. The wireless input device generates operation power according to the radio frequency signal. The control chip is coupled to the wireless signal receiver. The control chip is activated according to the radio frequency signal. The control chip performs computation and processing to generate input information by detecting an input operation on an input interface based on the operation power. The wireless signal transmitter is coupled to the control chip, and transmits the input information to the external electronic apparatus based on the operation power.

The electronic apparatus of the present invention includes a host interface and one or more aforementioned wireless input devices.

The control method for the wireless input device of the present invention includes: receiving a radio frequency signal by an external electronic apparatus; activating the wireless input device according to the radio frequency signal, generating operation power according to the radio frequency signal, generating input information by detecting an input operation on an input interface based on the operation power; and enabling the wireless input device to transmit the input information to the external electronic apparatus based on the operation power.

Based on the above, the wireless input device of the present invention generates the operation power through the received radio frequency signal and performs the input operation on the input interface to generate the input information. The wireless input device of the present invention may be self-powered without an external battery, so that the area of the wireless input device is saved. Moreover, the wireless input device of the present invention may operate normally only by virtue of the operation power generated by the radio frequency signal, so that the electrical energy consumption is effectively reduced.

In order to make the aforementioned features and advantages of the present invention comprehensible, embodiments accompanied with accompanying drawings are described in detail below.

DESCRIPTION OF THE EMBODIMENTS

Figure 1:
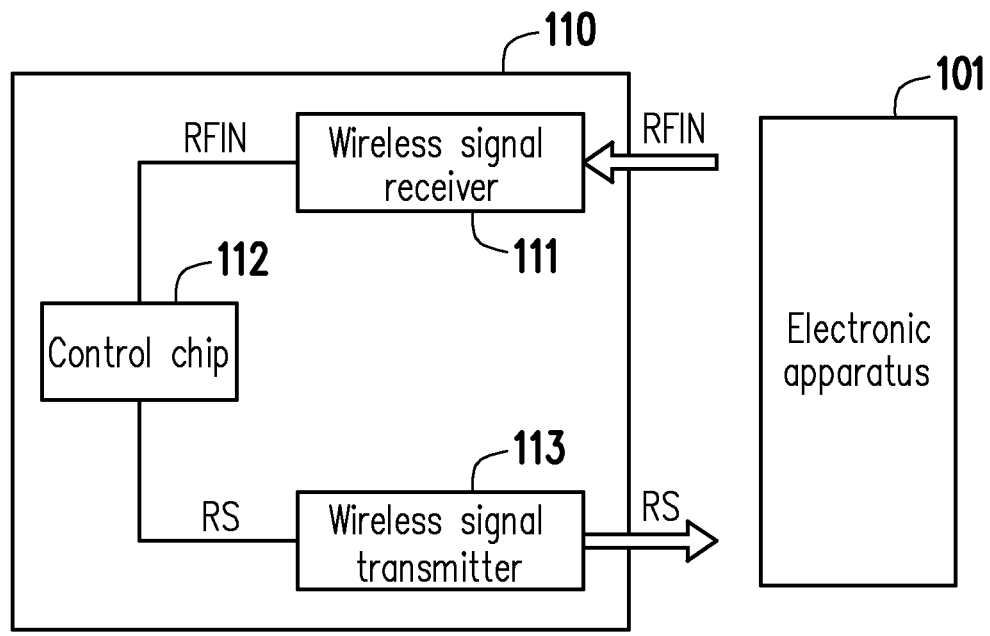
FIG. 1 is a schematic diagram of a wireless input device according to an embodiment of the present invention.

Referring to FIG. 1, FIG. 1 is a schematic diagram of a wireless input device according to an embodiment of the present invention. The wireless input device 110 includes a wireless signal receiver 111, a control chip 112 and a wireless signal transmitter 113. The wireless input device 110 is coupled to an external electronic apparatus 101, and performs the information transmission with the external electronic device 101 in a wireless communication manner.

In the present embodiment, the wireless signal receiver 111 is coupled to the external electronic apparatus 101, and receives a radio frequency signal RFIN from the external electronic apparatus 101. The control chip 112 is coupled to the wireless signal receiver 111, and receives the radio frequency signal RFIN through the wireless signal receiver 111. The control chip 112 may be activated or powered on according to the radio frequency signal RFIN, generate operation power according to the radio frequency signal RFIN and generate input information RS by detecting an input operation on an input interface based on the operation power. The wireless signal transmitter 113 is coupled to the control chip 112. The control chip 112 transmits the generated input information RS to the wireless signal transmitter 113, and transmits the input information RS to the external electronic apparatus 101 through the wireless signal transmitter 113.

Specifically, before the radio frequency signal RFIN is received, the control chip 112 is in a disabled (deactivated) state and does not work. After the radio frequency signal RFIN is received, the control chip 112 may generate the operation power according to the radio frequency signal RFIN and work based on the generated operation power. In addition, the radio frequency signal RFIN transmitted by the external electronic apparatus 101 may include identification information. The control chip 112 may process the radio frequency signal RFIN and acquire the identification information. The control chip 112 may further determine or identify the identification information, thereby being activated to perform a subsequent process. Herein, a piece of setup information may be pre-stored in the control chip 112. The control chip 112 may compare the identification information and the setup information to determine whether to be activated to perform the subsequent process or not. In an embodiment of the present invention, the setup information may be written into a memory of the control chip 112 in advance. In another embodiment of the present invention, one or more key components or switch components may be arranged on the wireless input device 110 to enable a user to set up the setup information.

After the control chip 112 is activated according to the identification information in the radio frequency signal RFIN, the control chip 112 may detect the input operation on the input interface of the wireless input device 110. The wireless input device 110 of the present embodiment may be a wireless keyboard or a wireless tablet, and the input interface of the wireless input device 110 may be an array of keys, a touch pad or a handwriting device that could trace or recognize information input by the user. For example, the wireless input device 110 is the wireless keyboard, and the activated control chip 112 may perform the detection process on the input operation on the array of keys. Specifically, the control chip 112 may perform a key scanning process on the array of keys and generate the input information RS (for example, a keyboard scan code) corresponding to the user's operation.

In addition, the external electronic apparatus 101 may periodically send the radio frequency signal RFIN. The wireless input device 110 may generate the operation power for operation according to the periodically received radio frequency signal RFIN. A sending duration and/or interval of the radio frequency signal RFIN may be determined according to electrical energy required by the wireless input device 110 for the input operation on the input interface and generation of the input information. A sending frequency of the radio frequency signal RFIN may be set according to a frequency of the input operation conducted by the user.

In an embodiment of the present invention, a frequency band used by the radio frequency signal RFIN may be between 450 megahertz and 1,452 megahertz, or between 2,400 megahertz and 2,500 megahertz.

Figure 2:
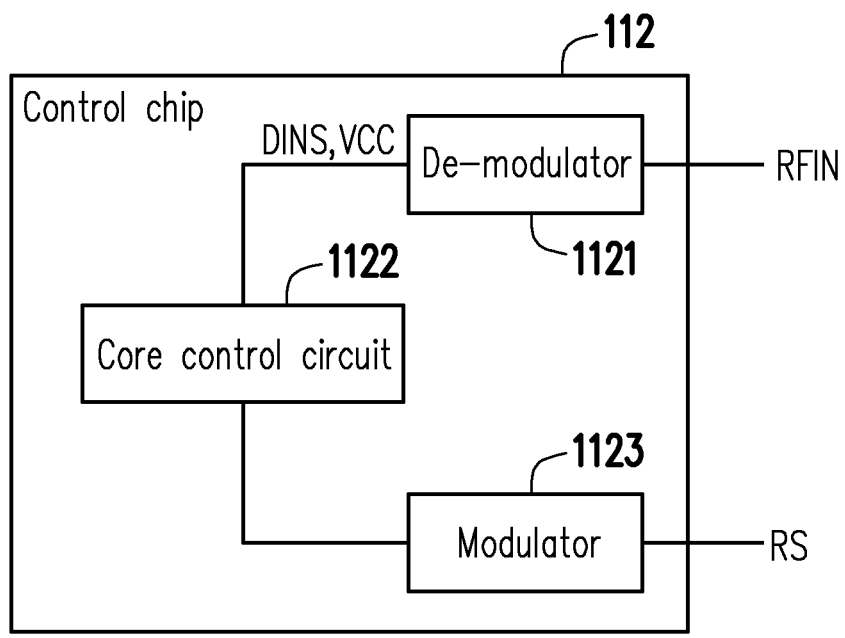
FIG. 2 is a schematic diagram of an implementation mode of a control chip according to an embodiment of the present invention.

Referring to FIG. 2, FIG. 2 is a schematic diagram of an implementation mode of a control chip according to an embodiment of the present invention. The control chip 112 includes a de-modulator 1121, a core control circuit 1122 and a modulator 1123. The de-modulator 1121 is configured for coupling to the core control circuit 1122 and coupling to a wireless signal receiver (for example, the wireless signal receiver 111 in FIG. 1) outside the control chip 112. The de-modulator 1121 is configured to receive a radio frequency signal RFIN and perform de-modulation on the radio frequency signal RFIN. Through the de-modulation performed by the de-modulator 1121, the de-modulator 1121 may acquire identification information DINS in the radio frequency signal RFIN and generate operation power VCC according to the radio frequency signal RFIN.

The operation power VCC may be supplied to the core control circuit 1122. The core control circuit 1122, based on the operation power VCC, may perform a comparison process on the identification information DINS and setup information, and determine, according to a comparison result, whether to activate the control chip 112 to enable the control chip 112 to detect an input operation on an input interface.

On another aspect, the modulator 1123 is coupled to the core control circuit 1122. Under the condition that the control chip 112 has been activated, the core control circuit 1122 may generate input information according to the input operation on the input interface, and perform, through the modulator 1123, modulation on the input information to generate modulated input information RS. The modulated input information RS is transmitted to a wireless signal transmitter (for example, the wireless signal transmitter 113 in FIG. 1) outside the control chip 112, and the modulated input information RS is sent to an external electronic apparatus (for example, the electronic apparatus 101) through the wireless signal transmitter 113.

In an embodiment of the present invention, the core control circuit 1122 may additionally generate response information when the identification information DINS and the setup information are matched, and the modulated input information RS and the response information are integrated for transmission to the external electronic apparatus 101. Herein, the response information may include an identifier of the wireless input device. Therefore, the external electronic apparatus 101 may learn a signal source of the input information RS according to the response information.

In the above description, the response information may be information the same as the setup information in the aforementioned embodiment and may be set in the same manner.

In addition, the configuration of the core control circuit 1122 may be implemented by use of a logic circuit, an analogue circuit or a mix-mode circuit. The core control circuit 1122 operates when the control chip 112 is activated, and is idling when the control chip 112 is not activated. The de-modulator 1121 and the modulator 1123 may be implemented through configurations of a de-modulator circuit and a modulator circuit familiar to those of ordinary skill in the art respectively.

Figure 3:
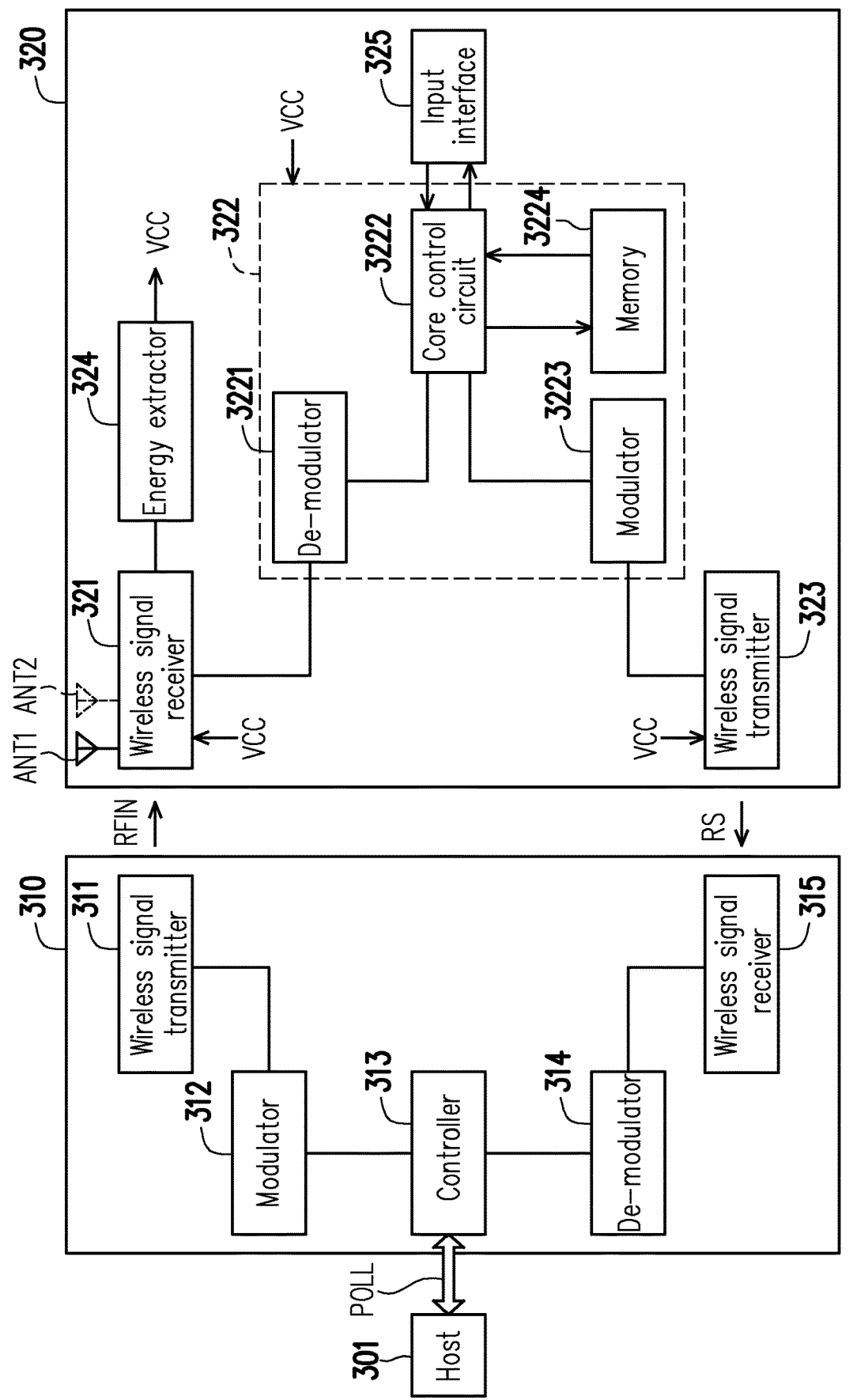
FIG. 3 is a schematic diagram of an electronic apparatus according to an embodiment of the present invention.

Referring to FIG. 3, FIG. 3 is a schematic diagram of an electronic apparatus according to an embodiment of the present invention. The electronic apparatus 300 includes a host interface 310 and a wireless input device 320. The host interface 310 and the wireless input device 320 are mutually coupled through a wireless communication signal. A controller 313 in the host interface 310 is coupled to a host 301.

The host interface 310 includes a wireless signal transmitter 311, a modulator 312, the controller 313, a de-modulator 314 and a wireless signal receiver 315. The wireless input device 320 includes a wireless signal receiver 321, a control chip 322, a wireless signal transmitter 323, an energy extractor 324 and an input interface 325. Herein, the control chip 322 includes a de-modulator 3221, a core control circuit 3222, a modulator 3223 and a memory 3224.

In the present embodiment, the host 301 may periodically generate a query signal POLL. The host interface 310 generates a radio frequency signal RFIN according to the query signal POLL and periodically sends the radio frequency signal RFIN to the wireless input device 320 through the wireless signal transmitter 311 to wake up the wireless input device 320. The wireless input device 320 receives the radio frequency signal RFIN through the wireless signal receiver 321. The control chip 322 processes identification information in the radio frequency signal RFIN, and is activated based on operation power generated according to the radio frequency signal RFIN. Based on the operation power, the control chip 322 in an activated state detects an input operation on the input interface 325 and accordingly generates input information RS. The control chip 322 transmits the input information RS back to the wireless signal receiver 315 of the host interface 310 through the wireless signal transmitter 323. Details regarding the control chip 322 have been described in the aforementioned embodiments and will not be described herein.

In the present embodiment, a sending duration and/or interval of the query signal POLL may be determined according to electrical energy required by the wireless input device 320 for execution of the input operation on the input interface and generation of the input information. The query signal POLL may be set according to a frequency of execution of the input operation by a user. A sending frequency and period of the query signal POLL may be substantially the same as a sending frequency and period of the radio frequency signal RFIN.

It is noted that, in the present embodiment, the energy extractor 324 is coupled to the wireless signal receiver 321. The energy extractor 324 generates operation power VCC according to the radio frequency signal RFIN received by the wireless signal receiver 321. The operation power VCC may be supplied to the control chip 322, the wireless signal receiver 321 and the wireless signal transmitter 323 to provide electrical energy required by operations of the control chip 322, the wireless signal receiver 321 and the wireless signal transmitter 323. In other embodiments of the present invention, the energy extractor 324 may also be arranged in the control chip 322.

In addition, in an embodiment of the present invention, the wireless signal receiver 321 may be coupled to a single antenna ANT1. The antenna ANT1 is configured to receive the radio frequency signal RFIN. Herein, the radio frequency signal RFIN may have a data signal portion and an energy signal portion. The energy extractor 324 may generate the operation power VCC according to the energy signal portion of the radio frequency signal RFIN. The control chip 322 decodes the data signal portion of the radio frequency signal RFIN to obtain a data signal. In other embodiments of the present invention, the wireless signal receiver 321 may also be coupled to multiple antennas ANT1 and ANT2. The antennas ANT1 and ANT2 are configured to receive the radio frequency signal RFIN of different frequency bands respectively. Herein, the antenna ANT1 may receive a radio frequency signal transmitting the data signal portion, and the antenna ANT2 may receive a radio frequency signal transmitting the energy signal portion. The energy extractor 324 may generate the operation power VCC according to the energy signal portion received by the antenna ANT2.

In the embodiments of the present invention, the energy extractor 324 further includes an energy storage unit (for example, a capacitor), configured to store electrical energy obtained by converting energy of the received radio frequency signal RFIN to prolong maintenance time of the operation power VCC.

In addition, the wireless signal receiver 315 of the host interface 310 may be configured to receive the input information RS. After the de-modulation of the information by the de-modulator 314, the controller 313 may obtain the input operation conducted by the user and may then perform a corresponding process. In an embodiment, the controller 313 may be a processor with computation capabilities. In another embodiment, the controller 313 may be a hardware circuit configured in a design manner of hardware description language (HDL) or any other digital circuits and implemented by a field programmable gate array (FPGA), a complex programmable logic device (CPLD) or an application-specific integrated circuit (ASIC).

On another aspect, the controller 313 may perform the modulation on the identification information through the modulator 312 and enable the wireless signal transmitter 311 to transmit the radio frequency signal RFIN. When the host interface 310 is in an operable mode, the host interface 310 may periodically send the radio frequency signal RFIN.

Figure 4:
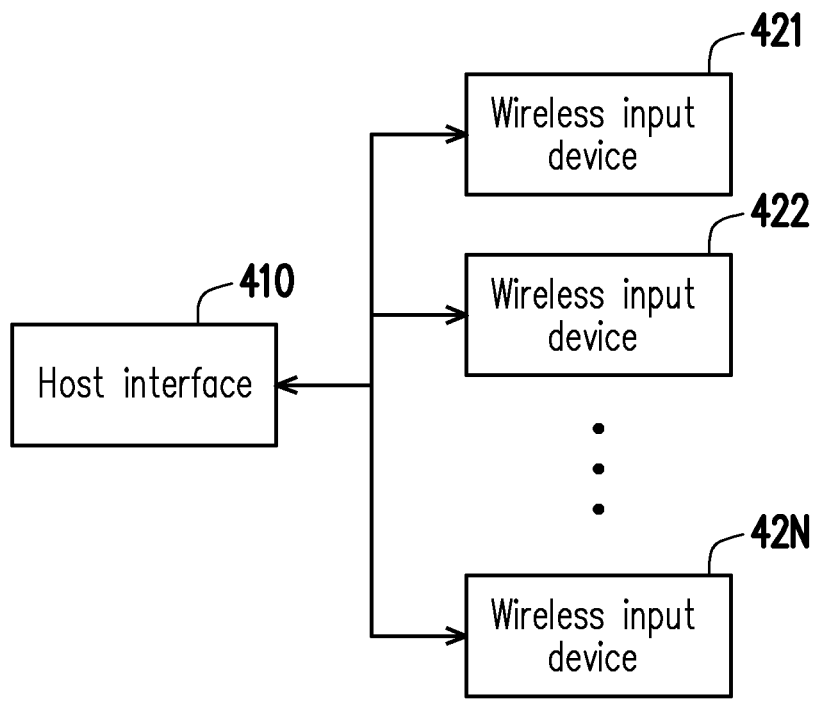
FIG. 4 is a schematic diagram of an electronic apparatus according to another embodiment of the present invention.

Referring to FIG. 4 below, FIG. 4 is a schematic diagram of an electronic apparatus according to another embodiment of the present invention. In FIG. 4, the electronic apparatus 400 includes a host interface 410 and multiple wireless input devices 421-42N. The host interface 410 may be implemented according to the host interface 310 in the embodiment of FIG. 3, and the various wireless input device 421-42N may be implemented by applying the wireless input device 320 in the embodiment of FIG. 3. It is noted that, after the wireless input devices 421-42N are activated, the wireless input devices 421-42N may generate multiple pieces of response information respectively and transmit the response information to the host interface 410. Therefore, the host interface 410 may learn that the multiple wireless input devices 421-42N are connected with the host interface 410 and perform input operations. Under this condition, the host interface 410 may set multiple coded values for the wireless input devices 421-42N respectively and transmit these coded values to the wireless input devices 421-42N respectively.

Figure 5:
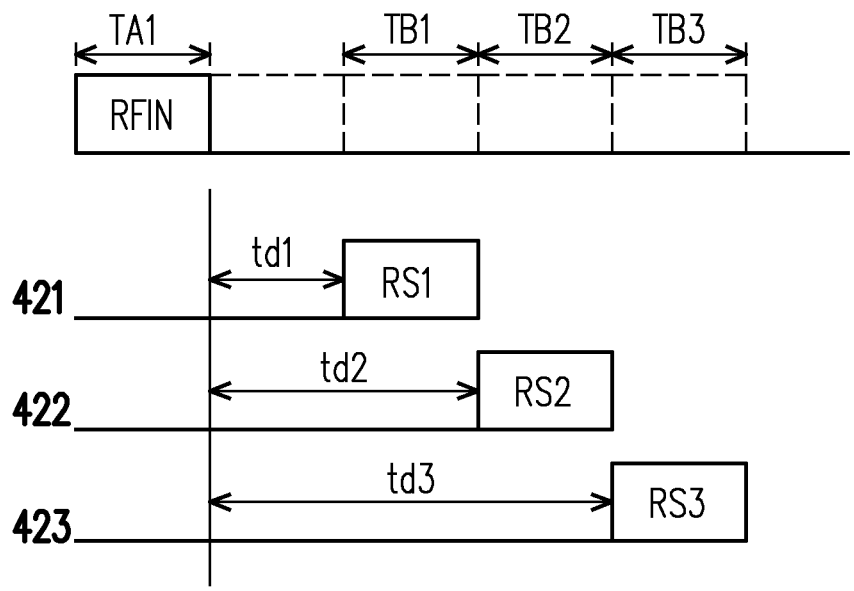
FIG. 5 is a diagram of a transmission time sequence of input information of multiple wireless input devices according to an embodiment of the present invention.

Referring to both of FIG. 4 and FIG. 5 below, FIG. 5 is a diagram of a transmission time sequence of input information of multiple wireless input devices according to an embodiment of the present invention. Herein, wireless input devices 421, 422 and 423 are taken as examples. When the wireless input devices 421, 422 and 423 are activated, the host interface 410 may, for example, set coded values 1, 2 and 3 for the wireless input devices 421, 422 and 423 and transmit the coded values 1, 2 and 3 to the wireless input devices 421, 422 and 423, respectively. When the wireless input devices 421, 422 and 423 transmit input information RS1, RS2 and RS3 respectively, the transmission of the input information RS1, RS2 and RS3 are performed with respective time delays td1, td2 and td3 based on a receiving time of the radio frequency signal RFIN. Therefore, the timing when the host interface 410 receives the input information RS1, RS2 and RS3 may be effectively staggered, and the misoperation caused by mutual interference of the input information RS1, RS2 and RS3 is avoided.

Figure 6:
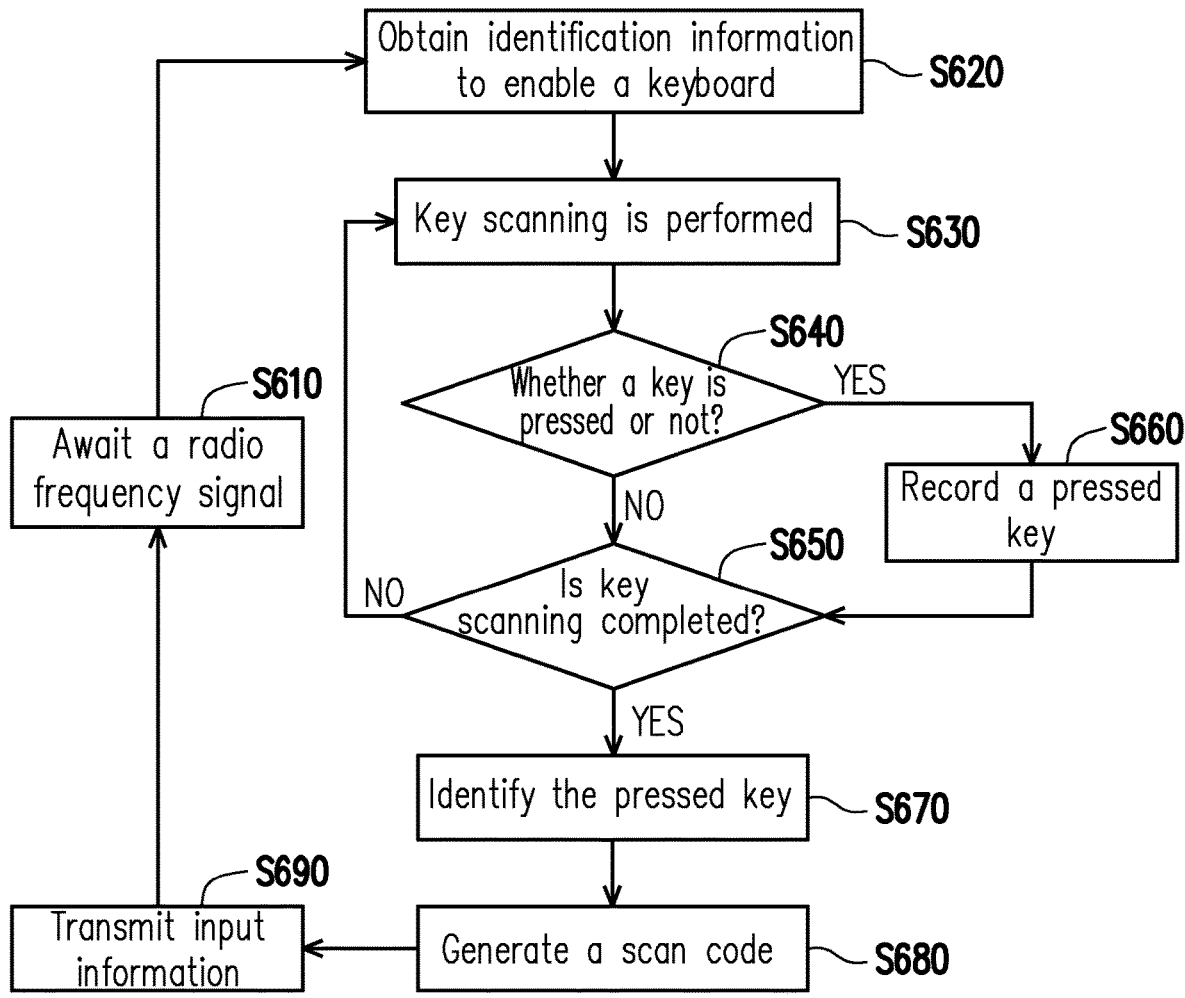
FIG. 6 is an input operation flowchart of a wireless input device according to an embodiment of the present invention.

Referring to FIG. 6, FIG. 6 is an input operation flowchart of a wireless input device according to an embodiment of the present invention. In FIG. 6, the wireless input device is, for example, a keyboard. In step S610, the wireless input device waits for a radio frequency signal sent by an external electronic apparatus (host). In step S620, identification information is obtained from the radio frequency signal, and the keyboard is enabled (activated) according to the identification information. Then, in step S630, the keyboard may perform a key scanning action based on operation power generated according to the radio frequency signal. In step S640, whether a key is pressed or not is determined. When it is determined in step S640 that a key is pressed, step S660 is performed to record the pressed key, and step S650 is performed to determine whether key scanning has been completed or not. On the contrary, when it is determined in step S640 that no key is pressed, step S650 is directly performed.

If it is determined in step S650 that key scanning is not completed, step S630 is performed to scan the keys again. On the contrary, if it is determined in step S650 that key scanning has been completed, step S670 is performed to identify the pressed key. Then, in step S680, a scan code is generated according to the identification action in step S670, and input information is accordingly generated. In step S690, the input information is transmitted to the external electronic apparatus (the host).

It is noted herein that, after the input information is transmitted, the wireless input device may enter step S610 and wait for receiving a next radio frequency signal and performing an input operation subsequently.

Figure 7:
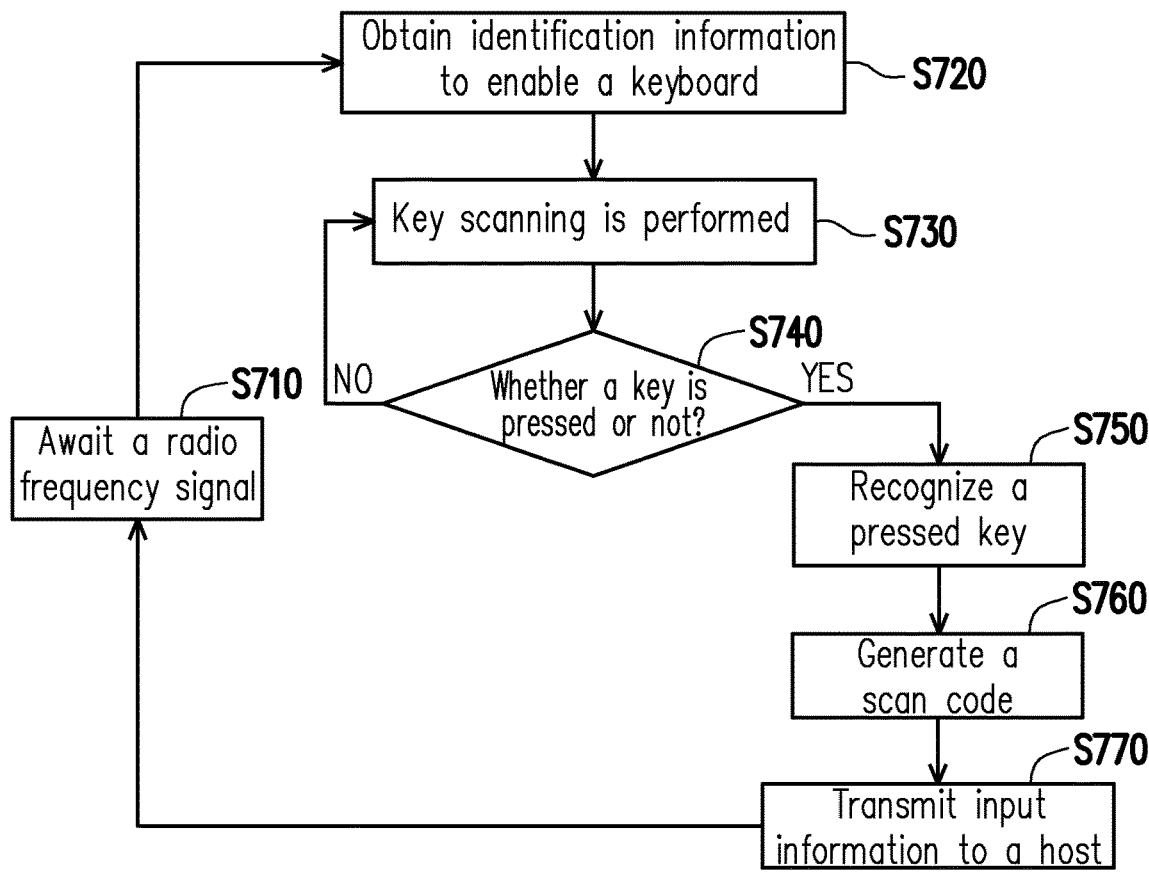
FIG. 7 is another input operation flowchart of a wireless input device according to an embodiment of the present invention.

Referring to FIG. 7, FIG. 7 is another input operation flowchart of a wireless input device according to an embodiment of the present invention. In FIG. 7, the wireless input device is also, for example, a keyboard. Herein, in step S710, a radio frequency signal is awaited. After the radio frequency signal is received, the radio frequency signal is processed in step S720 to obtain identification information therein, and the keyboard is enabled (activated) according to the identification information. Moreover, the wireless input device obtains operation power according to the radio frequency signal. Then, key scanning action is performed in step S730, and whether a key is pressed or not is determined in step S740. When it is detected that a key is pressed in step S740, the pressed key is recognized in step S750, a scan code corresponding to the pressed key is generated in step S760, and input information is transmitted to a host in S770. On the contrary, when it is detected in S740 that no key is pressed, step S730 is continuously performed for re-scanning the keys.

It is particularly noted that, in an embodiment of the present invention, when it is detected in step S740 that a key is pressed, the scan code of the pressed key is transmitted to the host in real time. Thus, once an input combination of multiple keys is performed on the keyboard, a state of the input combination may be reported to the host in real time, and then the host may perform a corresponding action in real time.

Figure 8:
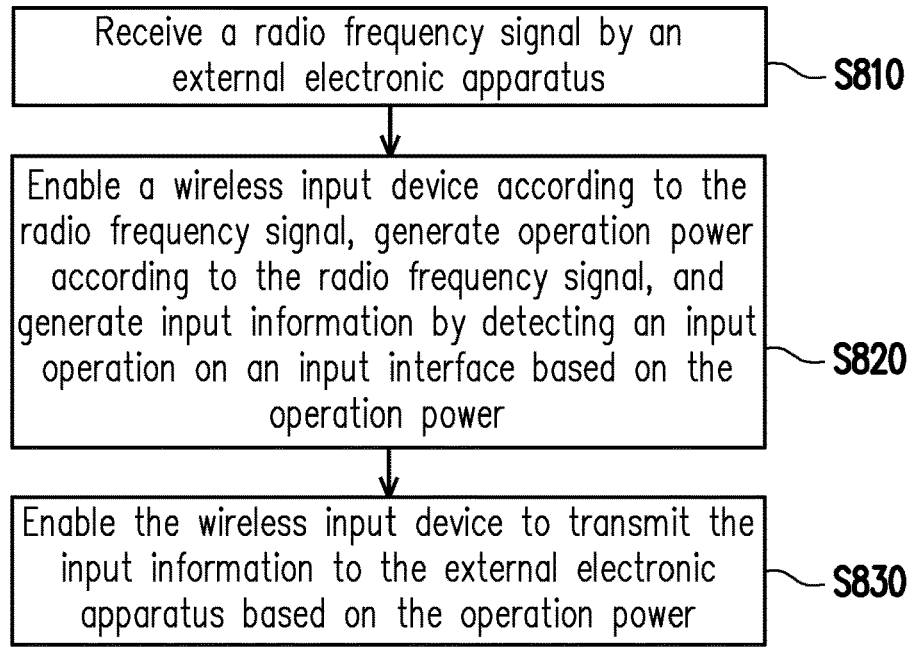
FIG. 8 is a flowchart of a control method for a wireless input device according to an embodiment of the present invention.

Referring to FIG. 8 below, FIG. 8 is a flowchart of a control method for a wireless input device according to an embodiment of the present invention. In step S810, a radio frequency signal is received from an external electronic apparatus. In step S820, the wireless input device is activated according to the radio frequency signal, operation power is generated according to the radio frequency signal, and input information is generated by detecting an input operation on an input interface based on the operation power. In step S830, the wireless input device is enabled to transmit the input information to the external electronic apparatus based on the operation power.

Details of implementing the foregoing steps have been described in the aforementioned embodiments, and will not be described repeatedly.

Based on the above, the wireless input device in an embodiment of the present invention may generate the operation power based on the periodic radio frequency signal, and, based on the operation power, detect the input operation on the input interface and transmit the obtained input information back. The wireless input device in an embodiment of the present invention may be self-powered without an additional battery or cell embedded inside the device, so that the device size and the production cost may be effectively reduced. Moreover, the wireless input device in an embodiment of the present invention is provided with a low power consumption that only requires the electrical energy converted from the received radio frequency signal as the operation power.

The present invention has been disclosed above with the embodiments but is not limited thereto. Any person of ordinary knowledge in the art may make some modifications and embellishments without departing from the spirit and scope of the present invention. Therefore, the scope of protection of the present invention should be defined by the appended claims.

What is claimed is:

1. A wireless input device, comprising:
  a wireless signal receiver, receiving a radio frequency signal from an external electronic apparatus;
  a control chip, coupled to the wireless signal receiver, the control chip being activated based on an operation power generated by the radio frequency signal, and generating an input information by detecting an input operation on an input interface based on the operation power; and
  a wireless signal transmitter, coupled to the control chip and transmitting the input information to the external electronic apparatus based on the operation power,
  wherein the control chip comprises:
  a de-modulator, coupled to the wireless signal receiver, the de-modulator performing de-modulation on the radio frequency signal and obtaining identification information;
  a core control circuit, coupled to the de-modulator and activated according to the identification information based on the operation power, the activated core control circuit generating the input information by detecting the input operation on the input interface; and
  a modulator, coupled to the core control circuit, the modulator performing modulation on the input information to generate modulated input information,
  wherein the modulator transmits the modulated input information to the wireless signal transmitter.

2. The wireless input device according to claim 1, further comprising:
  an energy extractor, coupled to the wireless signal receiver and generating the operation power according to the radio frequency signal.

3. The wireless input device according to claim 2, wherein the energy extractor is arranged in the control chip.

4. The wireless input device according to claim 2, wherein the wireless signal receiver is coupled to an antenna to receive the radio frequency signal, and the energy extractor generates the operation power according to an energy signal portion of the radio frequency signal.

5. The wireless input device according to claim 2, wherein the wireless signal receiver is coupled to a first antenna and a second antenna to receive the radio frequency signal having a first frequency band and a second frequency band respectively, and
the energy extractor generates the operation power according to the second frequency band.

6. The wireless input device according to claim 1, wherein the radio frequency signal comprises an identification information, and the control chip is activated according to the identification information.

7. The wireless input device according to claim 1, wherein the wireless signal receiver periodically receives the radio frequency signal, and a sending duration of the radio frequency signal is related to electrical energy required by detection of the input operation on the input interface by the control chip and generation of the input information.

8. The wireless input device according to claim 1, wherein the control chip generates response information according to the identification information of the radio frequency signal, and the control chip sends the response information to the external electronic apparatus by using the wireless signal transmitter.

9. The wireless input device according to claim 1, wherein the control chip further comprises:
a memory, coupled to the core control circuit and configured to store setup information; and
the core control circuit determines whether to be activated or not according to comparison between the identification information and the setup information.

10. An electronic apparatus, comprising:
a host interface, coupled to a host of the electronic apparatus; and
at least one wireless input device, coupled to the host interface, wherein the at least one wireless input device comprises:
a wireless signal receiver, receiving a radio frequency signal from the host interface, the radio frequency signal comprising an identification information;
a control chip, coupled to the wireless signal receiver, the control chip being activated based on an operation power generated by the radio frequency signal and the identification information, and generating determining whether to generate an input information by detecting an input operation on an input interface based on the operation power and generate the identification information generated by performing de modulation on the radio frequency signal; and
a wireless signal transmitter, coupled to the control chip and transmitting the input information to the host interface based on the operation power,
wherein the control chip comprises:
a de-modulator, coupled to the wireless signal receiver, the de-modulator performing de-modulation on the radio frequency signal and obtaining the identification information;
a core control circuit, coupled to the de-modulator and activated according to the identification information based on the operation power, the activated core control circuit generating the input information by detecting the input operation on the input interface; and
a modulator, coupled to the core control circuit, the modulator performing modulation on the input information to generate modulated input information,
wherein the modulator transmits the modulated input information to the wireless signal transmitter.

11. The electronic apparatus according to claim 10, wherein the at least one wireless input device further comprises:
an energy extractor, coupled to the wireless signal receiver and generating the operation power according to the radio frequency signal.

12. The electronic apparatus according to claim 11, wherein the wireless signal receiver is coupled to an antenna to receive the radio frequency signal, and the energy extractor generates the operation power according to an energy signal portion in the radio frequency signal.

13. The electronic apparatus according to claim 11, wherein the wireless signal receiver is coupled to a first antenna and a second antenna to receive the radio frequency signal having a first frequency band and a second frequency band respectively, and the energy extractor generates the operation power according to the second frequency band.

14. The electronic apparatus according to claim 10, wherein the host periodically transmits a query signal, the host interface generates the radio frequency signal according to the query signal, and the host determines a sending duration of the query signal according to electrical energy required by the control chip to detect the input operation on the input interface and generate the input information.

15. The electronic apparatus according to claim 10, wherein the control chip generates response information according to the identification information, and sends the response information to the host through the wireless signal transmitter.

16. The electronic apparatus according to claim 10, wherein the control chip further comprises:
a memory, coupled to the core control circuit and configured to store setup information; and
the core control circuit determines whether to be activated or not according to comparison between the identification information and the setup information.

17. The electronic apparatus according to claim 10, wherein, when the electronic apparatus comprises multiple wireless input devices, the host generates multiple device codes corresponding to the multiple wireless input devices respectively, the multiple wireless input devices set multiple time delays corresponding to the multiple device codes respectively, and each wireless input device sends the input information according to each time delay.

18. A control method for a wireless input device, wherein the wireless input device comprises a wireless signal receiver, a control chip and a wireless signal transmitter, comprising:
receiving, by the wireless signal receiver, a radio frequency signal from an external electronic apparatus;
activating, by the control chip, the wireless input device according to the radio frequency signal, generating an operation power according to the radio frequency signal, and generating input information by detecting an input operation on an input interface based on the operation power; and
transmitting, by the wireless signal transmitter and based on the operation power, the input information to the external electronic apparatus,
wherein the control chip comprises:
a de-modulator, coupled to the wireless signal receiver, the de-modulator performing de-modulation on the radio frequency signal and obtaining identification information;

a core control circuit, coupled to the de-modulator and activated according to the identification information based on the operation power, the activated core control circuit generating the input information by detecting the input operation on the input interface; and a modulator, coupled to the core control circuit, the modulator performing modulation on the input information to generate modulated input information, wherein the modulator transmits the modulated input information to the wireless signal transmitter.

19. The control method according to claim 18, wherein the step of activating the wireless input device according to the radio frequency signal comprises:

processing, by the wireless input device, the radio frequency signal to obtain identification information;

activating the wireless input device according to the identification information; and generating, by the wireless input device, response information according to the identification information, and sending the response information to the external electronic apparatus.

\* \* \* \* \*